United States Patent
Schmidt et al.

(10) Patent No.: US 6,783,778 B1
(45) Date of Patent: Aug. 31, 2004

(54) ENERGY-RICH FOOD FLAKES FOR FISH AND INVERTEBRATES AND METHOD FOR THE PRODUCTION THEREOF

(75) Inventors: Hartmut Schmidt, Georgsmariehutte (DE); Hubert Kurzinger, Melle (DE)

(73) Assignee: Tetra Holding (US), Inc., Blacksburg, VA (US)

( * ) Notice: Subject to any disclaimer, the term of this patent is extended or adjusted under 35 U.S.C. 154(b) by 0 days.

(21) Appl. No.: 10/009,408

(22) PCT Filed: May 27, 2000

(86) PCT No.: PCT/EP00/04847
§ 371 (c)(1),
(2), (4) Date: Jul. 2, 2002

(87) PCT Pub. No.: WO00/76329
PCT Pub. Date: Dec. 21, 2000

(30) Foreign Application Priority Data

Jun. 14, 1999 (DE) ........................ 199 26 932

(51) Int. Cl.⁷ .............................. A23K 1/00; A23K 1/18
(52) U.S. Cl. ........................... 426/2; 426/517; 426/601; 426/805
(58) Field of Search ........................... 426/2, 517, 601, 426/805

(56) References Cited

U.S. PATENT DOCUMENTS

| 3,186,909 A | 6/1965 | McMurtry et al. ............ 167/81 |
| 4,696,634 A | 9/1987 | Zeller ......................... 425/237 |
| 5,783,240 A | * 7/1998 | Wenger et al. .............. 426/231 |
| 5,863,586 A | * 1/1999 | Johnsen et al. ............. 426/438 |

FOREIGN PATENT DOCUMENTS

| DE | 3707032 | | 9/1988 |
| DE | 29910322 | | 6/1999 |
| EP | 0 927 522 | | 7/1999 |
| EP | 1175836 | * | 1/2002 |
| GB | 2290216 | * | 12/1995 |
| JP | 05284913 | * | 11/1993 |
| JP | 8-9895 | | 1/1996 |
| JP | 08009995 | | 1/1996 |
| WO | 9809542 | | 3/1998 |
| WO | 9825478 | | 6/1998 |

OTHER PUBLICATIONS

Mali Boonyaratpalin, et al. "Diet preparations for aquarium fishes", Aquaculture, vol. 12, No. 1, 1977, pp. 53–62 (XP–000930081).

* cited by examiner

Primary Examiner—C. Sayala
(74) Attorney, Agent, or Firm—Merchant & Gould

(57) ABSTRACT

The invention relates to a homogeneous high-fat food provided in the form of food flakes, to a method for producing the same and to the use thereof for promoting the growth, the ingestion of food, and the condition of freshwater and saltwater fish and invertebrates. The inventive food flakes are used to improve resistance to stress, to prevent losses due to unfavorable keeping conditions such as high temperatures in the summer and low temperatures in the winter when keeping pond fish, and to reduce nitrogen and phosphorous excretion which promotes algae growth.

12 Claims, No Drawings

ENERGY-RICH FOOD FLAKES FOR FISH AND INVERTEBRATES AND METHOD FOR THE PRODUCTION THEREOF

Usually, at present, fish feeds, especially for ornamental fish, are characterised by a relatively high protein content (about 40–50%) and amount of starch (about 16–30%) in the case of simultaneously relatively small energy content (about 0.5–8% fat). Such feeds can be produced industrially without problem in forms of application usual for the maintenance of fish (feed flakes, floatable extrudates, tablets) and lead to a good growth and to a sufficient nutrition of the animals.

On the other hand, for the breeding and feeding of useful fish, energy-rich feed in the form of extrudates or pellets are increasingly used which, besides a high protein content important for the growth, have fat contents of up to 25% (BioMar GmbH, company brochure "F ütterung/Umwelt-Ecoline"). The use of such feeds in the professional fish breeding leads, in comparison with fat-poorer products, to less water-contaminating, nitrogen-containing excretion products (ammonia, nitrite, nitrate) since the energy requirement of the animals is predominantly covered by the nitrogen-free fats. Therefore, the nitrogen-containing proteins serve the growth as broadly as possible and do not have to be metabolised for the gaining of energy with formation of nitrogen-containing decomposition products. Furthermore, fats are superior to carbohydrates as carriers of energy in fish nutrition since fish—unlike evolutionary higher standing animals—can only limitedly utilise carbohydrates because of their metabolic characteristics. Therefore, the use of fat-rich fish feeds in the maintenance of useful fish has not only economic but also ecological advantages due to the saving of proteins and the smaller excretion of water-contaminating materials.

Such feeds were hitherto not used for ornamental fish in the aquarium or in the garden pond since serious technological disadvantages counter the said advantages. The production of slowly sinking feed flakes which, because of the size of the animals in the ornamental fish nutrition, are usual, with high fat proportions was hitherto not possible on a technical scale since fatrich feed mixtures for the production of flakes according to the usual processes stick on the roller driers normally used and cannot be removed to give a comminutable foil strip.

Surprisingly, it has now been found that, with a new production process, flaked feed with high energy content in the form of fat/oil can also be produced and thus the condition of fish can be distinctly improved.

The new process is based on the rolling out of formed bodies which can be produced e.g. by extrusion or pelleting, to give thin feed flakes slowly sinking in water.

Thus, energy-rich feed flakes were produced with the new process and tested on typical ornamental fish for aquaria with regard to suitability in comparison with traditional standard feeds with low fat contents: In a feeding experiment on two different ornamental fish species (*Labidochromis caeruleus, Barbus conchonius*), there was tested for effectiveness a flaked experimental feed with high energy content (33% fat) in comparison with a control feed (7% fat) over a period of time of 12 weeks in the case of a water temperature of 25° C.

The results clearly demonstrate that, in the case of the application of the energy-rich flake feed, the feed uptake is clearly increased and the growth of the fish is significantly better in comparison with the control. Similar results are shown in the case of the feeding of experimental flakes with 18% or 23% of fat in comparison with a test diet with 8% fat.

Therefore, having regard to these surprising new findings, the production and the use of fat-rich flaked feed is also advantageous for the maintenance of ornamental fish.

Therefore, the subject of the present invention is an energy-/fat-rich flake feed for fish and invertebrates, as well as the production and use of these flakes.

A flaked ornamental fish feed is preferred which, in homogeneous distribution, contains energy in the form of 12–40% fat, preferably 12 to 20% and quite especially preferably about 15 to 19% fat in the case of a moisture content of 1 to 30%, preferably 4 to 25% and quite especially preferably of about 8%. In addition, this feed contains the usual basic components, such as 25–50% protein, preferably 43%, 10 to 25% starch, preferably 13% and 10 to 60% N-free extract materials, preferably 20%, whereby all statements of amount are referred to the weight of the product.

For the production of energy-rich feed flakes, there can be used, according to the methods set out in the following, all commercially available liquid and solid fats and oils of animal or vegetable origin, individually or in combination (e.g. soya oil, fish oils, marine animal fats, tallow, sunflower oil, maize oil).

The energy addition in the form of fat/oil in high dosagings for flaked feed for fish and invertebrates takes place during the mixing of the flour-formed and liquid feed components. Thus, a homogeneous distribution is already ensured in the raw material mixture before the subsequent extrusion or pelleting process and following rolling out to give flakes.

In the case of the production of extrudates, the weighed out recipe components are homogeneously mixed in a mixer with the necessary amounts of energy in the form of fat/oil and extruded. Thereby, for example, first 330 kg of energy-rich raw material mixture are extruded with a barrel extruder speed of 60–98%, preferably 75%, and a temperature at the meal introduction region of 40–160° C., preferably 75° C., and in the nozzle head of 40–190° C., preferably 75° C., with addition of 1–100 l, preferably 30 l of water per hour to give 1 to 50, preferably 2–4 mm long extrudates with a stick diameter of 1 to 10 mm, preferably 2–4 mm.

Brought about by the geometry of the outlet nozzle of-the extruder and of the desired section length of the extrusion billet, sections are obtained with equal three-dimensional form.

Subsequently, these extrudates are rolled out directly in a cylinder mill to give uniformly formed flakes with a thickness between 10 $\mu$m and 5 mm and a diameter between 1 to 100 mm, which also possess an equal three-dimensional form.

Formed bodies with substantially equal three-dimensional form suitable for rolling out can also be obtained by. pelletisation of the fat-rich raw material mixture which can subsequently be rolled out to give uniformly formed flakes.

In the case of the production of formed bodies by means of extrusion, the temperature is reducible to <80° C.

In the case of this process, after the production no additional working steps, such as e.g. spraying or coating with oils/fats for the energy enrichment—as in the case of conventional pellets—are necessary.

A further subject of the invention is the use of the homogeneous fat-rich feed according to the invention for the promotion of growth, feed uptake and condition of ornamental fish in fresh and sea water, for the improvement of the resistance against stress, for the prevention of losses in the case of unfavourable maintenance conditions, such as high temperatures in the summer and low temperatures in the winter in the case of the maintenance of pond fish, as well as for the reduction of the nitrogen and phosphorus excretion promoting algal growth.

Summary

Homogeneous fat-rich feed in the form of feed flakes, as well as process for the production and its use for the promotion of growth, feed uptake and condition of fishes and invertebrates in fresh and sea water, for the improvement of the resistance against stress, for the prevention of losses in the case of unfavourable maintenance conditions, such as high temperatures in the summer and low temperatures in the winter, in the maintenance of pond fish, as well as for the reduction of nitrogen and phosphorus excretion promoting algal growth.

What is claimed is:

1. A homogenous fat-rich flake feed for fish and invertebrates comprising uniformly formed flakes having a fat content of 12 to 40% and a residual moisture content of 1 to 30%.

2. A homogenous fat-rich feed according to claim 1, wherein the fat content is from 12 to 20% and a moisture content from 4 to 25%.

3. A homogeneous fat-rich feed according to claim 2, wherein the fat content is 18% and a moisture content is 8%.

4. A homogeneous fat-rich flake fish feed for fish and invertebrates comprising uniformly formed flakes having a fat content of 12 to 40%, a residual moisture content of 1 to 30%, 25 to 50% protein, 10 to 25% starch, and 10 to 60% N-free extract materials.

5. A feed according to claim 4 wherein the fat content comprises liquid or solid fat/oil components.

6. A feed according to claim 5, wherein the fat/oil component is soya oil, fish oils, marine animal fats, tallow, sunflower oil, maize oil or mixtures thereof.

7. A process for producing fat-rich fish feed flakes having a fat content of 12 to 40% and a residual moisture of 1 to 30%, comprising the steps of homogeneously mixing the recipe components; extruding the mixture at a i.) barrel extruder speed of 60–98%; ii) a temperature in the meal introduction region of 40–160° C.; iii.) a temperature in the nozzle head of 40–190° C. while iv.) adding 1-100 l of water per hour to give 1 to 50 mm long extrudates with a stick diameter of 1 to 10 mm wherein said extrudates can be subsequently rolled out to give flakes having a thickness between 10 mm and 5 mm and a diameter between 1 mm and 100 mm.

8. A method for promoting growth, feed uptake and condition of ornamental fish in fresh and seawater comprising applying to fresh and seawater a homogenously fat-rich fish feed comprising uniformly formed flakes having a fat content of 12 to 40% and a residual moisture of 1 to 30%.

9. A method of maintaining ornamental fish in fresh and seawater comprising applying to fresh and seawater a homogenous fat-rich fish feed comprising uniformly formed flakes having a fat content of 12 to 40% and a residual moisture of 1 to 30%.

10. The method according to claim 9 wherein the maintenance is the improvement of the resistance against stress.

11. The method according to claim 9 wherein the maintenance is the prevention of losses in the case of unfavorable maintenance conditions.

12. The method according to claim 9 wherein the maintenance is the reduction of nitrogen and phosphorous excretion promoting algal growth.

* * * * *